United States Patent
Hong et al.

(10) Patent No.: US 12,510,862 B2
(45) Date of Patent: Dec. 30, 2025

(54) DEVICE ACQUIRING HOLOGRAPHY AND SYSTEM INCLUDING THE SAME

(71) Applicant: ELECTRONICS AND TELECOMMUNICATIONS RESEARCH INSTITUTE, Daejeon (KR)

(72) Inventors: Kee Hoon Hong, Daejeon (KR); Ki Hong Choi, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 840 days.

(21) Appl. No.: 17/837,573

(22) Filed: Jun. 10, 2022

(65) Prior Publication Data

US 2022/0397860 A1 Dec. 15, 2022

(30) Foreign Application Priority Data

Jun. 11, 2021 (KR) .......... 10-2021-0076049
May 20, 2022 (KR) .......... 10-2022-0061957

(51) Int. Cl.
*G03H 1/04* (2006.01)
*G02B 5/30* (2006.01)
(Continued)

(52) U.S. Cl.
CPC .......... *G03H 1/0493* (2013.01); *G02B 5/3083* (2013.01); *G02B 27/283* (2013.01);
(Continued)

(58) Field of Classification Search
CPC ...... G03H 1/0493; G03H 1/0443; G03H 1/06; G03H 2001/0452; G03H 2222/14;
(Continued)

(56) References Cited

U.S. PATENT DOCUMENTS

| 6,151,185 A | 11/2000 | Ishizuka et al. |
| 7,522,343 B2 | 4/2009 | Hsieh |

(Continued)

FOREIGN PATENT DOCUMENTS

| JP | 10-141917 | 5/1998 |
| KR | 10-2005-0098952 | 10/2005 |

(Continued)

OTHER PUBLICATIONS

KiHong Choi et al., "Achromatic phase shifting self-interference incoherent digital holography using linear polarizer and geometric phase lens", Optics Express, Jun. 25, 2018, pp. 16212-16225. vol. 26, No. 13.

(Continued)

*Primary Examiner* — Nathanael R Briggs
(74) *Attorney, Agent, or Firm* — KILE PARK REED & HOUTTEMAN PLLC

(57) ABSTRACT

Disclosed herein a device acquiring holography and system including the same. The device includes: a beam splitter module splitting a light emitted from an object into a first beam and a second beam which have polarizations in different states; and an optical control module equipped with a first reflective optical element, which is disposed at one side of the beam splitter module and receives and emits the first beam to the beam splitter module, and a second reflective optical element which is placed at the other side of the beam splitter module, receives the second beam and emits the second beam to the beam splitter module so as to have differences of optical path and wavefront from the first beam. The beam splitter module, the first reflective optical element and the second reflective optical element are monolithically installed by being fixed to each other.

8 Claims, 8 Drawing Sheets

(51) Int. Cl.
*G02B 27/28* (2006.01)
*G03H 1/06* (2006.01)

(52) U.S. Cl.
CPC .......... *G03H 1/0443* (2013.01); *G03H 1/06* (2013.01); *G03H 2001/0452* (2013.01); *G03H 2222/14* (2013.01); *G03H 2222/45* (2013.01); *G03H 2223/22* (2013.01); *G03H 2223/24* (2013.01)

(58) Field of Classification Search
CPC .......... G03H 2222/45; G03H 2223/22; G03H 2223/24; G02B 5/3083; G02B 27/283
See application file for complete search history.

(56) References Cited

U.S. PATENT DOCUMENTS

| | | | |
|---|---|---|---|
| 8,570,524 | B2 | 10/2013 | Wan et al. |
| 9,360,299 | B1 | 6/2016 | Kim |
| 2019/0049302 | A1* | 2/2019 | Kim .................. G01J 3/0256 |
| 2019/0072898 | A1* | 3/2019 | Kim .................. G03H 1/06 |
| 2019/0179263 | A1 | 6/2019 | Lim et al. |
| 2019/0204784 | A1 | 7/2019 | Hong et al. |

FOREIGN PATENT DOCUMENTS

| | | |
|---|---|---|
| KR | 10-1078197 | 11/2011 |
| KR | 10-2017-0092803 | 8/2017 |
| WO | 2004/074880 | 9/2004 |

OTHER PUBLICATIONS

Myung K. Kim, "Full color natural light holographic camera", Optics Express, Apr. 22, 2013, pp. 9636-9642, vol. 21, No. 8.

Kihong Choi et al., "Michelson-interferometric-configuration-based incoherent digital holography with a geometric phase shifter", Applied Optics, Mar. 1, 2020, pp. 1948-1953. vol. 59, No. 7.

* cited by examiner

FIG. 3

| PATH | OBJECT | BEAM SPLITTER | FIRST AND SECOND QUARTER WAVE PLATES | FIRST AND SECOND REFLECTIVE OPTICAL ELEMENTS | FIRST AND SECOND QUARTER WAVE PLATES | BEAM SPLITTER | POLARIZATION CONTROL ELEMENT | POLARIZED IMAGE SENSOR |
|---|---|---|---|---|---|---|---|---|
| ① | Unpol. | ↕ | ↻ | ↺ | ↔ | ↔ | ↺ | ↕ ↔ ↗ ↘ |
| ② | Unpol. | ↔ | ↻ | ↻ | ↕ | ↕ | ↻ | |

FIG. 5

| PATH | THIRD REFLECTIVE OPTICAL ELEMENT | THIRD REFLECTIVE OPTICAL ELEMENT | FOURTH REFLECTIVE OPTICAL ELEMENT | THIRD REFLECTIVE OPTICAL ELEMENT | POLARIZATION CONTROL ELEMENT | POLARIZED IMAGE SENSOR | |
|---|---|---|---|---|---|---|---|
| ③ | Unpol. | ↕ | - | - | ↺ | ↕ | ↔ ↗ ↘ |
| ④ | Unpol. | ↔ | ↔ | ↔ | ↻ | | |

DEVICE ACQUIRING HOLOGRAPHY AND SYSTEM INCLUDING THE SAME

CROSS REFERENCE TO RELATED APPLICATION

The present application claims priority to Korean patent application 102021-0076049, filed Jun. 11, 2021 and Korean patent application 10-2022-0061957, filed May 20, 2022, the entire contents of which are incorporated herein for all purposes by this reference.

BACKGROUND OF THE INVENTION

Field of the Invention

The present disclosure relates to a device and system for acquiring a hologram, and more particularly, to a device and system for acquiring a hologram, which are capable of realizing oscillation robustness, wavelength independence and real-time holography, of enhancing high degree of freedom in design and holographic characteristics and of accomplishing the simplification and miniaturization of optical systems.

Description of the Related Art

A hologram can be obtained using a light source with coherence, and laser may be used as such a light source. Specifically, as a laser light source is scattered from a target object, an object beam containing reflective object information and a reference beam for interference with the object beam are generated. The hologram is formed by the interference between the object beam and the reference beam.

An existing interferometer for acquiring a hologram assumes the usage of laser as a coherence light source. When laser is used, a hologram with interference fringes may be acquired irrespective of an optical path, an optical path angle and optical modulation difference between an object beam and a reference beam which constitute 2 channels of the interferometer. However, in consideration of such problems as the expensiveness, safety and beam size limitations of laser, the acquisition of an interference fringe using a laser light source is limited to the laboratory environment.

Even in a general light source condition with very low coherence, if a length difference of optical paths in 2 channels is within dozens of micrometers, interference between the 2 channels is possible so that a hologram may be acquired. As a method of acquiring a hologram without using laser that is a coherent light source, there is the self-interference incoherent digital holography (SIDH) that uses an incoherent light source. SIDH may use 2 channels in which an object beam (e.g., spherical wave) scattering from an object point is split by a beam splitter, without a separate channel for forming a reference beam. Although SIDH is capable of acquiring a hologram by using a natural light, since an object beam and a reference beam have channels in different directions, SIDH has some shortcomings like a limitation in reducing a form factor and vulnerability to oscillation.

Apart from SIDH, the GP-SIDH hologram acquisition method using a geometric phase lens (GP-lens) has been proposed as a method of acquiring a hologram by using a natural light. A geometric phase lens is composed of passive elements formed in thin films. A geometric phase lens may function as a concave lens or convex lens which has a same focal distance according to the linear polarization state of an incident light. Accordingly, when a light in a linear polarization state is incident on a geometric phase lens, a part of the lens functions as a concave lens and the remaining part functions as a convex lens, so that a wave front is modulated.

Although being an indispensable optical component in GP-SIDH, the geometric phase lens has shortcomings like wavelength dependency and difficulty of fabrication. Furthermore, two types of optical modulation by a geometric phase lens need to consider a specific consideration. For example, the specific condition may be a coherence length condition according to a fixed focal distance of the geometric phase lens (+−f lens). The specific condition functions as a limiting condition of an optical design according to GP-SIDH.

Meanwhile, since a hologram image obtained by SIDH, GP-SIDH and the like contains not only three-dimensional information on a target object but also image noise of a DC component and a conjugate image component, noise needs to be removed. Holography image processing for removing image noise is referred to as phase shifting. In order to perform phase shifting, information on at least one of two channels used for forming an interference fringe contains three or more phase shiftings different from each other, for example, phase shiftings at an interval of 1, 2, 3*π/4.

A mechanical technique is proposed as a method of processing a phase shifting in hologram photographing. The piezoelectric actuated phase shifting or the geometric phase shifting is a technique thus proposed. The piezoelectric actuated phase shifting generates a phase shifting by applying a piezoelectric element on any one of two mirrors, which constitute a wave front modulation optical system of SIDH, for example, and thus by moving the physical position of the mirror. The geometric phase shifting uses the phase delay principle caused by a polarization change. For example, in the case of GP-SIDH, the geometric phase shifting may generate a phase shifting by rotating a linear polarizer at a specific angle interval. For example, in the case of SIDH, the geometric phase shifting may generate a phase shifting by rotating, at a specific angle, any one of two quarter wave plates that are coaxially installed on one mirror of a wave front modulation optical system.

However, since phase shifting by the above-described mechanical techniques is accompanied by a mechanical movement like translation or rotation, a hologram is impossible to acquire in real time.

In summary, the existing SIDH, which is proposed as a method of acquiring a hologram by using a natural light, is vulnerable to oscillation and difficult to miniaturize because of a two-channel optical system. In the GP-SIDH, the geometric phase lens has wave dependency and is very difficult to fabricate. Furthermore, the GP-SIDH also has a disadvantage of limited degree of freedom in design because the wave front modulation of reference and object beams is fixed to a focal distance of a geometric phase lens. In addition, since there are only mechanical techniques for phase shifting that is applied for removing image noise in these methods, it has a limitation in acquiring a hologram in real time.

SUMMARY OF THE INVENTION

The present disclosure is technically directed to provide a device and system for acquiring a hologram, which are not only resistant to oscillations and realize oscillation robustness, wavelength independence and real-time holography but also are capable of enhancing high degree of freedom in design and holographic characteristics and accomplishing the simplification and miniaturization of an optical system.

The technical objects of the present disclosure are not limited to the above-mentioned technical object, and other technical objects that are not mentioned will be clearly understood by those skilled in the art through the following descriptions.

According to the present disclosure, there is provided a hologram acquisition device, the hologram acquisition device comprising: a beam splitter module splitting a light emitted from an object into a first beam and a second beam which have polarizations in different states; and an optical control module equipped with a first reflective optical element, which is disposed at one side of the beam splitter module and receives and emits the first beam to the beam splitter module, and a second reflective optical element which is placed at the other side of the beam splitter module, receives the second beam and emits the second beam to the beam splitter module so as to have differences of optical path and wavefront from the first beam. The beam splitter module, the first reflective optical element and the second reflective optical element are monolithically installed by being fixed to each other.

According to the embodiment of the present disclosure in the device, the first reflective optical element and the second reflective optical element may have a reflective optical surface with any one form of flat, convex, concave, curved surface having free-form and a diffuse reflective surface, or be configured as a diffractive optical element.

According to the embodiment of the present disclosure in the device, refractive indexes for the beam splitter in each optical path to the first reflective optical element and the second reflective optical element may be different in order to have a difference of optical path, or offset lengths in each optical path may be different in order to have a difference of optical path.

According to the embodiment of the present disclosure in the device, the first beam and the second beam may be linear polarizations at angles different from each other.

According to the embodiment of the present disclosure in the device, the device may further comprise a first quarter wave plate monolithically combined between the first reflective optical element and the beam splitter; and a second quarter wave plate monolithically combined between the second reflective optical element and the beam splitter. The first beam and the second beam, which are emitted from the beam splitter, may be incident on the first quarter wave plate and the second quarter wave plate and are output as circular polarizations with states different from each other, the first beam and the second beam having the circular polarizations may be wavefront modulated by being reflected from the first reflective optical element and the second reflective optical element, and the first beam and the second beam, which are wavefront modulated, may be incident on the first quarter wave plate and the second quarter wave plate again and are output as linear polarizations.

According to the embodiment of the present disclosure in the device, the beam splitter module may combine the first beam and the second beam, which have differences of optical path and wavefront, and emit the combined first and second beams to an image generating device located at an exterior of the beam splitter module. The hologram acquisition device further may comprise a polarization control element that is disposed between the image generating device and the beam splitter module and is monolithically combined with the beam splitter module. The polarization control element may output the linear polarization by changing the linear polarization to a polarization with a predetermined form in order to apply phase shifting processing performed in the image generating device.

According to the present disclosure, there is provided a hologram acquisition device, the hologram acquisition device comprising: a beam splitter module receiving a light emitted from an object; and an optical control module. The optical control module is equipped with a third reflective optical element, which is combined with the beam splitter module, reflects a third beam having a polarization in a predetermined state in a light emitted from the beam splitter module to the beam splitter module and make a fourth beam having a polarization in a different state from the state of the third beam penetrate selectively, and a fourth reflective optical element which is combined with the third reflective optical element, receives the fourth beam and emits the fourth beam to the beam splitter module through the third reflective optical element so as to have differences of optical path and wavefront from the third beam. The beam splitter module, the third reflective optical element and the fourth reflective optical element are monolithically installed by being fixed to each other.

According to the embodiment of the present disclosure in the device, the third reflective optical element and the fourth reflective optical element may be arranged to have a same optical axis.

According to another embodiment of the present disclosure, there is provided a hologram acquisition system, the system comprising: a hologram acquisition device equipped with a beam splitter module and an optical control module; and an image generating device receiving an interference fringe generated from the hologram acquisition device and generating a hologram image. The beam splitter module splits a light emitted from an object into a first beam and a second beam which have polarizations in different states. The optical control module is equipped with a first reflective optical element, which is disposed at one side of the beam splitter module and receives and emits the first beam to the beam splitter module, and a second reflective optical element which is placed at the other side of the beam splitter module, receives the second beam and emits the second beam to the beam splitter module so as to have differences of optical path and wavefront from the first beam. And the beam splitter module, the first reflective optical element and the second reflective optical element are monolithically installed by being fixed to each other.

The features briefly summarized above for this disclosure are only exemplary aspects of the detailed description of the disclosure which follow, and are not intended to limit the scope of the disclosure.

The technical problems solved by the present disclosure are not limited to the above technical problems and other technical problems which are not described herein will be clearly understood by a person (hereinafter referred to as an ordinary technician) having ordinary skill in the technical field, to which the present disclosure belongs, from the following description.

According to the present disclosure, a device and system for acquiring a hologram may be provided which are not only resistant to oscillations and realize oscillation robustness, wavelength independence and real-time holography but also are capable of enhancing high degree of freedom in design and holographic characteristics and accomplishing the simplification and miniaturization of an optical system.

Effects obtained in the present disclosure are not limited to the above-mentioned effects, and other effects not mentioned above may be clearly understood by those skilled in the art from the following description.

BRIEF DESCRIPTION OF THE DRAWINGS

FIG. 3 is a table exemplifying a polarization form and a change of state in each optical path in a hologram acquisition system according to an embodiment.

FIG. 5 is a table exemplifying a polarization form and a change of state in each optical path in a hologram acquisition system according to another embodiment.

DETAILED DESCRIPTION

Figure 1:
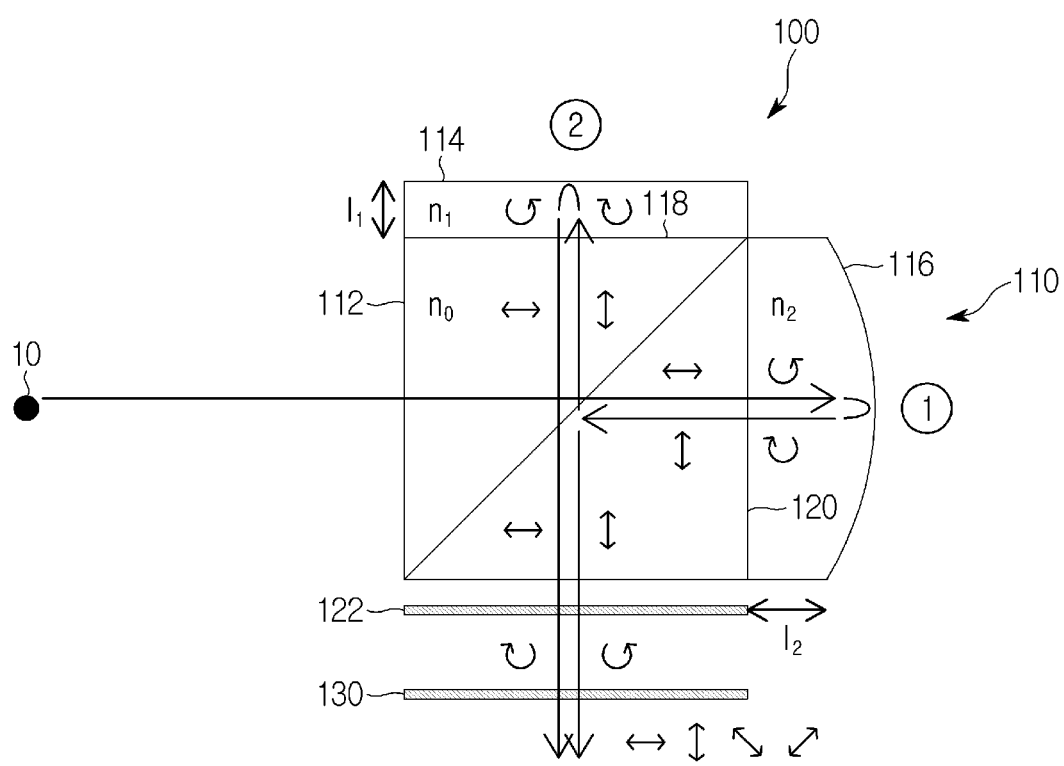
FIG. 1 is a view showing a configuration of a hologram acquisition system according to an embodiment of the present disclosure.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present invention and the way of attaining them will become apparent with reference to embodiments described below in detail in conjunction with the accompanying drawings. Embodiments, however, may be embodied in many different forms and should not be constructed as being limited to example embodiments set forth herein. Rather, these embodiments are provided so that this disclosure will be complete and will fully convey the scope of the invention to those skilled in the art.

In the present disclosure, expressions of relations of position used in this specification such as top, bottom, left and right are used for convenience of explanation, and when drawings shown in this specification are viewed backwards, the relations of position described in the specification may be understood to the contrary.

In the present disclosure, each of phrases such as "A or B", "at least one of A and B", "at least one of A or B", "A, B or C", "at least one of A, B and C", " " at Each of the phrases such as "at least one of A, B or C" and "at least one of A, B, C or combination thereof" may include any one or all possible combinations of the items listed together in the corresponding one of the phrases.

Hereinafter, embodiments of the present disclosure will be described with reference to the accompanying drawings.

Hereinafter, a hologram acquisition system according to an embodiment of the present disclosure will be described with reference to FIG. 1 and FIG. 2. FIG. 1 is a view showing a configuration of a hologram acquisition system according to an embodiment of the present disclosure.

A hologram acquisition system 100 is a device for generating a hologram based on a natural light, for example, and is capable of acquiring a hologram in real time, as it is equipped with an image generating device 130 including a polarized image sensor. In the present disclosure, the hologram acquisition system 100 is described as an example system based on natural light but is also applicable to a system using a laser light source that is a coherent light source.

The hologram acquisition system 100 according to FIG. 1 is a monolithic hologram acquisition system with two channels of optical paths and may be a self-interference incoherent digital holography (SIDH) using two channels of incoherent light sources.

Specifically, the hologram acquisition system 100 may include a hologram acquisition device 110 for generating an interference fringe based on a natural light scattered from an object 10 and an image generating device 130 for generating a hologram image by processing image displacement for the interference fringe. According to the present disclosure, the hologram acquisition device 110 may realize oscillation robustness and wavelength independence, enhance high degree of freedom in design and holographic characteristics and accomplish the simplification and miniaturization of an optical system.

The hologram acquisition device 110 may include a beam splitter module 112 for splitting an object beam, which scatters from an object on which a natural light is incident, into two channels, an optical control module for generating a difference of optical path between the two channels and emitting each channel through wavefront modulation, and a polarization control element 122 for outputting a wavefront-modulated polarization into a predetermined form so as to be applied to phase shifting processing performed in the image generating device 130.

In an embodiment, the beam splitter module 112 may have a function of splitting a beam into polarization types. The beam splitter module 112 may split a light emitted from the object 10, on which a natural light is incident, into a first beam and a second beam which have different forms of polarizations. The beam splitter module 112 may form the first beam and the second beam into linear polarizations at angles different from each other. In addition, the beam splitter module 112 may combine the first beam and the second beam, which are emitted by an optical control module to have differences in optical path and wavefront, and output the first and second beams thus combined to the polarization control element 122.

In an embodiment, an optical control module may be equipped with a first reflective optical element 114 disposed at one side of the beam splitter module 112 and a second reflective optical element 116 placed at the other side of the beam splitter module 112. In addition, the optical control module may be further equipped with a first quarter wave plate 118 interposed between the first reflective optical element 114 and the beam splitter module 112 and a second quarter wave plate 120 interposed between the second reflective optical element 116 and the beam splitter module 112.

The first reflective optical element 114, the first quarter wave plate 118 and the beam splitter module 112 may be combined to be monolithic. When monolithically combined, the above-described optical system, for example, the first reflective optical element 114, the first quarter wave plate 118 and the beam splitter module 112 may be assembled into a single component. Due to monolithic combination, an oscillation caused by an internal component of the hologram acquisition system 100 or occurring outside the hologram acquisition system 100 is propagated to the above-described optical system at a same level, so that, even when an error occurs because of the oscillation, the above-described optical system may output a beam or a signal with the same error based on the same oscillation. Due to monolithic combination, as every constituent optical system is fabricated as a single optical component, the hologram acquisition system 100 may have robustness to oscillations.

As an example of monolithic combination, the first reflective optical element 114 may be combined to the beam splitter module 112 through an attachment means (e.g., adhesive, screwing). As another example, in order to set a difference of optical path, the first reflective optical element 114 may be integrated with the beam splitter module 112, while being isolated from the beam splitter module 112 by means of an isolator (or spacer). In this case, the first reflective optical element 114, the isolator and the beam splitter module 112 may be monolithically combined using an attachment means provided at both sides of the isolator. When an isolator is placed, according to a design specification, the first quarter wave plate 118 may be monolithically combined with either of the two external sides of the isolator to be adjacent to the first reflective optical element 114 or the beam splitter module 112. According to a design specification, the first quarter wave plate 118 may be inserted into an isolator so that it may be located in integration with the isolator.

The first quarter wave plate 118 may receive a linear polarization, that is, a first beam at a specific angle split from the beam splitter module 112 and output a circular polarization in a specific state to the first reflective optical element 114. On an optical path, the plane of incidence of the first quarter wave plate 118 may have an optical axis aligned at a predetermined angle, for example, 45 degrees with a linear polarization output from an emittance plane of the beam splitter module 112 that is of a polarization type. Accordingly, the first quarter wave plate 118 may emit the optical axis aligned at the angle as a circular polarization in a specific state, for example, a left-circular polarization or a right-circular polarization.

The first reflective optical element 114 may reflect a circular polarization in a specific state associated with a first beam and thus emit a circular polarization in a different state from the state to the first quarter wave plate 118. For example, if a circular polarization before reflection is a left-circular polarization, a circular polarization after reflection may be a right-circular polarization. That is, a mirror plane of the first reflective optical element 114 may modulate the wave front of a first beam to make the first bream have a circular polarization in a different state from that of a second beam. In FIG. 1, the mirror plane of the first reflective optical element 114 is illustrated as a concave mirror with concave mirror surface, but it is possible to employ any form of reflective optical system which can modulate a beam passing two optical paths so differently as to form a hologram. For example, the first reflective optical element 114 may have a reflective optical surface with any one form of flat, convex, curved surface having free-form and a diffuse reflective surface or be configured as a diffractive optical element.

The first quarter wave plate 118 may receive a circular polarization in a different state and emit a first beam of a linear polarization to the beam splitter module 112. A linear polarization of a first beam may be shifted to a different phase to that of a linear polarization incident on the first quarter wave plate 118 and be output.

Similar to what is described above, a second reflective optical element 116, a second quarter wave plate 120 and the beam splitter module 112 may be combined to be monolithic. As the monolithic combination has an actually same meaning as the above-described meaning, it will be skipped.

The second quarter wave plate 120 may receive a linear polarization, that is, a second beam that is split from the beam splitter module 112 and has a different angle from a first beam, and output a circular polarization in a different state from the first beam to the second reflective optical element 116. Similar to the first quarter wave plate 118, on an optical path, the plane of incidence of the second quarter wave plate 120 may have an optical axis aligned at a predetermined angle, for example, 45 degrees with a linear polarization output from an emittance plane of the beam splitter module 112 that is of a polarization type. Accordingly, the second quarter wave plate 120 may emit the optical axis aligned at the angle as a circular polarization in a different state from the first beam, for example, a right-circular polarization or a left-circular polarization.

The second reflective optical element 116 may reflect a circular polarization associated with a second beam and thus emit a circular polarization changed into a different state to the second quarter wave plate 120. For example, if a circular polarization before reflection is a right-circular polarization, a circular polarization after reflection may be a left-circular polarization. That is, a mirror plane of the second reflective optical element 116 may modulate the wave front of a second beam to make the second bream have a circular polarization in a different state from that of a first beam. In FIG. 1, the mirror plane of the second reflective optical element 116 is illustrated as a flat mirror with a concave mirror surface, but it is possible to employ any form of reflective optical system which can modulate a beam passing two optical paths so differently as to form a hologram. For example, the second reflective optical element 116 may have a reflective optical surface with any one form of concave, convex, curved surface having free-form and a diffuse reflective surface or be configured as a diffractive optical element.

As an example, by the first and second reflective optical elements 114 and 116, to make a difference of optical path between first and second beams, refractive indexes $n_1$ and $n_2$ on each optical path to the first and second reflective optical elements 114 and 116 and a refractive index no of the beam splitter module 112 may be different from each other. As another example, offset lengths $l_1$ and $l_2$ on each optical path to the first and second reflective optical elements 114 and 116 may be different. As yet another example, in order to make a difference in optical path, both a refractive index and an offset length may be differently set. In order to generate a hologram, a difference between two optical paths may be defined by refractive indexes $n_1$ and $n_2$ and/or offset lengths $l_1$ and $l_2$, and the definition may be reflected in design and fabrication. The optical path difference thus defined may be designed within a coherence length of a light source required for acquiring a hologram based on a natural light.

The second quarter wave plate 120 may receive a circular polarization changed into a different state and emit a second beam of a linear polarization to the beam splitter module 112. A linear polarization of a second beam may be shifted to a different phase to that of a linear polarization incident on the second quarter wave plate 120 and be output.

As this embodiment uses not a geometric phase lens but a conventional reflective optical system for wave front modulation, it is easy to design and fabricate an optical system without wave-length dependence. In addition, since independent wavefront optical modulation of two channels is applied instead of ±f optical modulation of a geometric phase lens, degree of freedom in design increases significantly, and hologram characteristics may be enhanced by improving the hologram visibility and reducing an optical path length (ΔOPL). Furthermore, as an optical system performing functions of splitting an optical path and modulating a wave front is monolithically combined, unlike the conventional hologram acquisition systems (e.g., SIDH, GP-SIDH), the miniaturization and simplification of a system may be realized. Specifically, as miniaturization is possible down to a plate size of a sensor, the simplification and miniaturization of a system may be effectively accomplished.

Meanwhile, the polarization control element 122 may not only be disposed between the beam splitter module 112 and the image generating device 130 but also be monolithically combined with the beam splitter module 112. The monolithic combination has the actually same meaning as the above-described meaning. The polarization control element 122 may change respective linear polarizations of first and second beams emitted from the beam splitter module 112 into polarizations with a predetermined form and output the polarizations, so that the polarizations are applied to a phase shifting process performed in the image generating device 130. The respective linear polarizations may be formed in different phases. For example, the polarization control element 122 may be configured as a quarter wave plate, and in this case, a polarization with a predetermined form may be a circular polarization. Each circular polarization according to first and second beams may be determined according to a state of a linear polarization that is incident on the polarization control element 122.

The image generating device 130 may split first and second beams with circular polarizations in different states into a plurality of linear polarizations, for example, four linear polarizations and receive an interference fringe caused by interference between identical polarizations, thereby generating a hologram image. In FIG. 1, the image generating device 130 is illustrated as a part separate from the polarization control element 122 but may be integrated and combined with the beam splitter module 112, together with the polarization control element 122.

Figure 2:
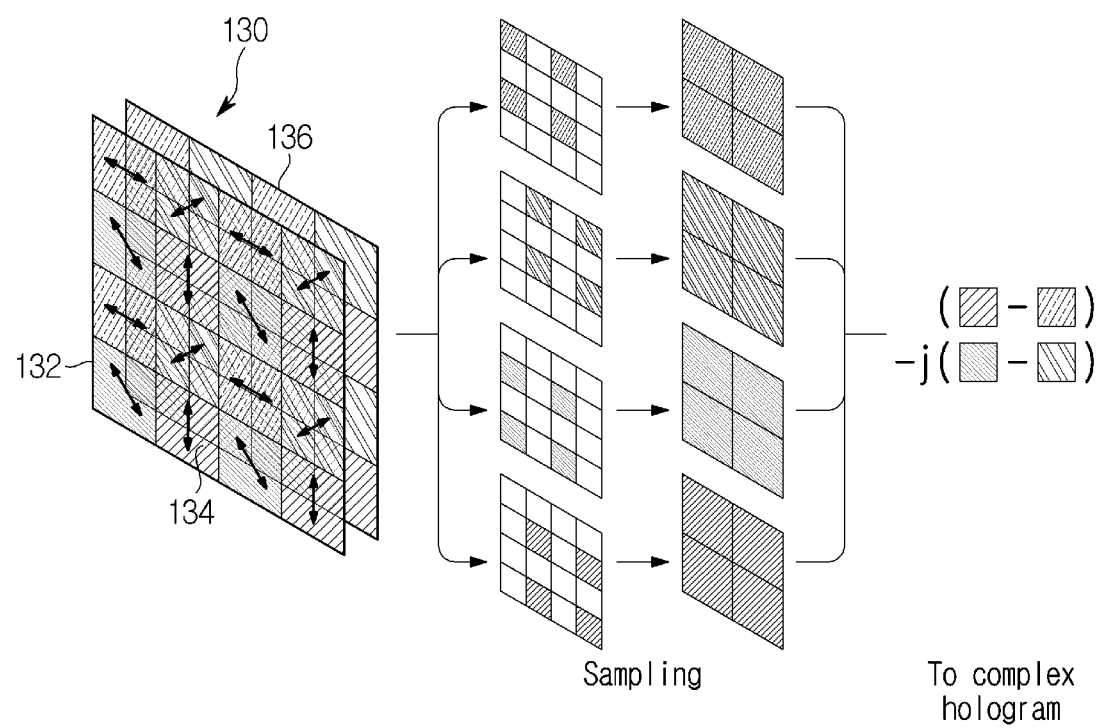
FIG. 2 is a view illustrating a configuration of an image generating device.

As exemplified in FIG. 2, the image generating device 130 may include not only three-dimensional information of the object 10, which is contained in a first beam and a second beam that are incident, but also a polarized image sensor in order to remove image noise of a direct component (DC) and a conjugate image component. The polarized image sensor may process phase shifting for an interference fringe by first and second beams and acquire a hologram image with the DC component and the conjugate image component being removed by using the phase-shifted interference fringe.

FIG. 2 is a view illustrating a configuration of an image generating device.

A polarized image sensor, which is exemplified as the image generating device 130, may function as a polarization-selective element. The polarization image sensor includes a micro polarizer array attached to a front face of an image sensor 136. For example, the image sensor 136 may be configured as a CCD. The micro polarizer array 132 is so formed that a plurality of micro polarizers 134 capable of converting transmitted light to linear polarization are arranged in respective corresponding splitting areas of the image sensor 136. The image sensor 136 may be equipped with a plurality of pixel arrays, and a splitting area for the image sensor 136 may be formed in a pixel unit. The micro polarizers 134 are formed to correspond to each pixel of the image sensor 136. Herein, light transmittance axes of the micro polarizers 134 may be formed to have different angles so that the phases of linear polarization converted through the micro polarizers 134 are different in each of the micro polarizers 134. Specifically, as illustrated in FIG. 2, the angles of the light transmittance axes at the micro polarizers 134 may be formed to have any one of 4 different types of light transmittance axis angles that sequentially change at 45-degree intervals. Thus, linear polarizations converted through each of the micro polarizers 134 may have a phase difference according to the angle of a light transmittance axis. Two linear polarizations converted through the micro polarizers 134 may be in a polarized state and be received by the image sensor 136. Herein, an interference fringe may be generated by interference of the two linear polarizations, which are converted from the left-circular polarization and the right-circular polarization, and the interference fringe thus generated may be obtained by the image sensor 136.

The micro polarizer array 132 may be used to perform phase shifting processing for removing image noise. Specifically, phase shifting processing may be performed through the micro polarizer array 132, so that at least one of two pieces of channel information (first beam and second beam) used for forming an interference fringe contains three or more phase shiftings, for example, 1, 2, 3π*/4. The principle of a representative four step phase shifting may be expressed in Equation 1. Detailed description of phase shifting processing will be provided through FIG. 3 below.

$$I_\delta = |\psi_0 + \psi_r \exp(-j\delta)|^2 = \quad \text{[Equation 1]}$$

$$|\psi_0|^2 + |\psi_r|^2 + \psi_0 \psi_r^* \exp(j\delta) + \psi_0^* \psi_r \exp(-j\delta)$$

$$I_0 = |\psi_0|^2 + |\psi_r|^2 + \psi_0 \psi_r^* + \psi_0^* \psi_r,$$

$$I_{\pi/2} = |\psi_0|^2 + |\psi_r|^2 + j\psi_0 \psi_r^* - j\psi_0^* \psi_r,$$

$$I_\pi = |\psi_0|^2 + |\psi_r|^2 - \psi_0 \psi_r^* - \psi_0^* \psi_r,$$

$$I_{3\pi/2} = |\psi_0|^2 + |\psi_r|^2 - j\psi_0 \psi_r^* + j\psi_0^* \psi_r.$$

$$I_0 - I_\pi = 2\psi_0 \psi_r^* + 2\psi_0^* \psi_r$$

$$I_{\pi/2} - I_{3\pi/2} = 2j\psi_0 \psi_r^* - 2j\psi_0^* \psi_r.$$

$$(I_0 - I_\pi) - j(I_{\pi/2} - I_{3\pi/2}) = 4\psi_0 \psi_r^*$$

$$\psi_0 = \frac{(I_0 - I_\pi) - j(I_{\pi/2} - I_{3\pi/2})}{4\psi_r^*}$$

Although not shown in FIG. 1, in order to optimize the photographic characteristics of a recorded hologram, an additional optical system like a linear polarizer with a specific angle may be installed between the object 10 and the hologram acquisition device 110 according to this embodiment or between the hologram acquisition device 110 according to this embodiment and the image generating device 130.

In this embodiment, due to the polarized image sensor 130 equipped with the micro polarizer array 132 at four different angles, geometric phase shifting may be processed with no mechanical movement. Furthermore, a real-time hologram may be acquired as different phase shiftings are simultaneously processed through the polarization control element 122 and the polarized image sensor 130. In addition, as the polarization control element 122 and the image generating device 130 are monolithically combined with the beam splitter module 112, the hologram acquisition system 100 may have robustness to oscillations.

Hereinafter, referring to FIG. 1 to FIG. 3, an operation of a hologram acquisition device according to this embodiment will be described. FIG. 3 is a table exemplifying a polarization form and a change of state in each optical path in a hologram acquisition system according to an embodiment.

In FIG. 1, ① and ② (hereinafter referred to as optical path 1 and optical path 2 respectively) denote optical paths which are modulated by the mirror surfaces of the first and second reflective optical elements 114 and 116 in order to form a hologram.

An object beam starting from the object 10 to be photographed may be incident on the beam splitter module 112 of a polarization type and be split into linear polarizations that are orthogonal to each other. Thus, first and second beams may be propagated to the optical path 1 and the optical path 2 respectively. Linear polarizations in different states, which are associated with the first and second beams emitted from the beam splitter module 112, may be incident on the first and second quarter wave plates 118 and 120 respectively, and the two optical paths may change the polarization form into circular polarizations that are orthogonal to each other.

Due to refractive indexes n1 and n2 and offset lengths $l_1$ and $l_2$ on the optical path 1 and the optical path 2 respectively, a difference between the optical paths is generated, and each circular polarization related to first and second beams may be reflected on mirror surfaces with different curved surfaces in the first and second reflective optical elements 114 and 116 and be modulated to different wave fronts. Herein, because of the reflection on the mirror surfaces, the left-circular polarization of the first beam may be modulated to a right-circular polarization, and the right-circular polarization of the second beam may be modulated to a left-circular polarization. Accordingly, by the first and second reflective optical elements 114 and 116 and the first and second quarter wave plates 118 and 120, a polarization state may be changed to a linear polarization at 90 degrees from an initial linear polarization.

The first and second beams reflected from the respective optical paths 1 and 2 may be incident on the beam splitter module 112 again and be integrated. The first and second beams thus integrated may pass through a quarter wave plate, which functions as the polarization control element 122, and be incident on the polarized image sensor 130. The first and second beams, which are input from the beam splitter module 112 to the polarized image sensor along the optical paths 1 and 2, may be interfered by each other, so that a hologram image may be formed.

As described above, in the polarized image sensor 130, by a micro polarizer consisting of four different light transmission axes in each pixel, a hologram may be recorded as four types of amplitude images corresponding to respective polarization states. The four amplitude hologram images thus recorded may be changed into different polarization forms and states in the hologram acquisition system 100 according to this embodiment and thus have different phase delay values. A polarization form and a state change may be exemplified as Table of FIG. 3.

A polarization change like in FIG. 3 may be analyzed using the Jones matrix calculus to derive a phase delay value. The polarization forms and states of two optical paths 1 and 2 according to the example of FIG. 3 may be expressed as Equation 2 using the Jones matrix. A polarization form and/or state is determined according to a design value or set value of at least one of the polarization control element 122 and the first and second quarter wave plates 118 and 120, and the polarization forms and/or states expressed FIG. 3 and Equation 2 are exemplified by being determined using a specified value among design values of the above-described elements. The polarization forms may be, for example, a linear polarization, a circular polarization and the like, and the polarization states may be an angle of a linear polarization, a left/right-circular polarization and the like.

$$T_① = LP_\theta \cdot Q(-45) \cdot Q(-45) \cdot M \cdot Q(45) \cdot H \quad \text{[Equation 2]}$$

$$T_② = LP_\theta \cdot Q(-45) \cdot Q(-45) \cdot M \cdot Q(45) \cdot V$$

In Equation 2, $H = \begin{pmatrix} 1 & 0 \\ 0 & 0 \end{pmatrix}$, $V = \begin{pmatrix} 0 & 0 \\ 0 & 1 \end{pmatrix}$, $LP_\theta = \begin{pmatrix} \cos^2\theta & \cos\theta\sin\theta \\ \cos\theta\sin\theta & \sin^2\theta \end{pmatrix}$, $M = \begin{pmatrix} -1 & 0 \\ 0 & 1 \end{pmatrix}$, and $Q(\theta) = e^{-\frac{i\pi}{4}} \begin{pmatrix} \cos^2\theta + i\sin^2\theta & (1-i)\cos\theta\sin\theta \\ (1-i)\cos\theta\sin\theta & \sin^2\theta + i\cos^2 \end{pmatrix}$.

Phase delay values of each optical path (optical path 1: α, optical path 2: β) in 4 linear polarization states (θ=0, 45, 90 and 135 degrees) of the polarized image sensor 130, which are derived through Equation 2, may be expressed as in Equation 3.

$$-\ \theta = 0$$
$$\alpha = 0,\ \beta = -\pi/4$$
$$-\ \theta = 45$$
$$\alpha = \pi/4,\ \beta = -2\pi/4$$
$$-\ \theta = 90$$
$$\alpha = \pi/2,\ \beta = -3\pi/4$$
$$-\ \theta = 135$$
$$\alpha = 3\pi/4,\ \beta = -\pi$$

[Equation 3]

An amplitude hologram recorded in the polarized image sensor 130 reflecting a phase delay value of each optical path may be defined by Equation 4.

$$I_\theta = |\psi_o e^{i\alpha} + \psi_r e^{i\beta}|^2 = |\psi_o e^{i\alpha}|^2 + |\psi_r e^{i\beta}|^2 + \psi_o \psi_r^* e^{i\alpha} e^{-i\beta} + \psi_o^* \psi_r e^{-i\alpha} e^{i\beta}$$

[Equation 4]

When phase shifting is applied using 4 amplitude holograms $I_0$, $I_{45}$, $I_{90}$ and $I_{135}$ obtained in the states of 4 linear polarizations ($\theta=0$, 45, 90 and 135 degrees) of the polarized image sensor 130, it is possible to acquire a complex hologram with spatial noise like DC and high order term being removed.

$$\psi_0 = \frac{(I_0 - I_{90})(1+i) + (I_{45} - I_{135})(1-i)}{8iR^*}$$

[Equation 5]

Figure 4:
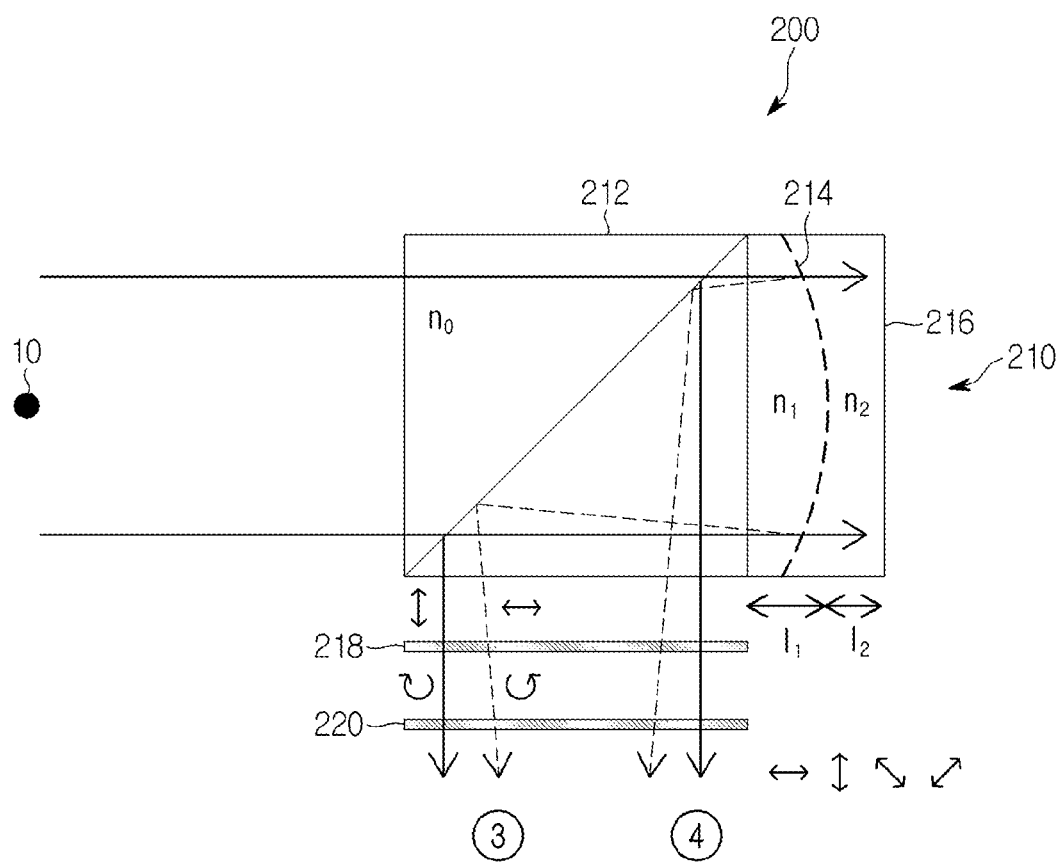
FIG. 4 is a hologram acquisition system according to another embodiment of the present disclosure.

Hereinafter, a hologram acquisition system according to another embodiment of the present disclosure will be described with reference to FIG. 4. FIG. 4 is a hologram acquisition system according to another embodiment of the present disclosure.

A hologram acquisition system 200 according to FIG. 4 may be an integrated hologram acquisition system with an optical path of a single channel and be a self-interference digital holography using an incoherent light source of a single channel.

Particularly, the hologram acquisition system 200 may include a hologram acquisition device 210 capable of generating an interference fringe based on a natural light scattered from the object 10 and an image generating device 220 capable of generating a hologram image by processing image displacement for the interference fringe. According to the present disclosure, the hologram acquisition device 210 may not only realize oscillation robustness, wavelength independence and real-time holography but also enhance high degree of freedom in design and holographic characteristics and accomplish the simplification and miniaturization of optical systems.

In the hologram acquisition system 200 according to another embodiment, the image generating device 220 is actually identical with the embodiment of FIG. 1 and thus the description below will focus mainly on the hologram acquisition device 210 that has a difference of configuration from FIG. 1.

The hologram acquisition device 210 may include a beam splitter module 212 capable of receiving an object beam scattered from an object on which a natural light is incident, an optical control module and a polarization control element 218.

In another embodiment, the beam splitter module 212 may be of a non-polarization type and receive and emit an object beam to an optical control module. In addition, the beam splitter module 212 may combine a third beam and a fourth beam, which are emitted by the optical control module to have differences in optical path and wavefront, and output the third and fourth beams thus combined to the polarization control element 218.

In another embodiment, the optical control module may receive an object beam, modulate the wave front by splitting the object beam into 2 channels, and emit it by generating a difference of optical path between the 2 channels.

Specifically, an optical control module may be equipped with a third reflective optical element 214 and a fourth reflective optical element 216, which are placed along one side of the beam splitter module 212. The third and fourth reflective optical elements 214 and 216 may be arranged to have a same optical axis. Herein, the third and fourth reflective optical elements 214 and 216 and the beam splitter module 212 may be combined so as to be monolithic. The monolithic combination and a combination form are actually the same as described in FIG. 1. According to the present disclosure, since every constituent optical system is fabricated as a single optical component, the hologram acquisition system 100 may have robustness to oscillations.

The third reflective optical element 214 may reflect a third beam with a predetermined state of polarization from an object beam to the beam splitter module 212 and make the fourth beam that has a polarization with a different state from that of the third beam penetrate selectively. Specifically, the third reflective optical element 214 may not pass but reflect the third beam with a linear polarization at a specific angle from an object beam and selective pass the fourth beam with a linear polarization at a different angle from the third beam, thereby splitting the object beam into 2 channels. In addition, when a linear polarization with a specific state in the third beam is reflected on the third reflective optical element 214, the third beam may retain and output the initial linear polarization to the beam splitter module 212, without any change in the state (that is, angle) of the linear polarization. Furthermore, since the fourth beam returning from the fourth reflective optical element 216 has a polarization state that penetrates the third reflective optical element 214, it may not be optically modulated by the third reflective optical element 214. In order to implement this, the third reflective optical element 214 may be configured as a polarization mirror surface having a reflective polarization surface. In FIG. 4, the third reflective optical element 214 is illustrated as a concave polarization mirror surface, but it is possible to employ any form of reflective optical system which can generate 2 optical paths and modulate a beam so differently as to form a hologram. For example, the third reflective optical element 214 may have a polarized reflective optical surface with any one form of flat, convex, curved surface having free-form and a diffuse reflective surface or be configured as a diffractive optical element.

In order to have differences of optical path and wave front from the third beam, the fourth reflective optical element 216 may receive and emit the fourth beam to the beam splitter module 112 via the third reflective optical element 214. In addition, when a linear polarization with a specific state in the fourth beam is reflected on the fourth reflective optical element 216, the fourth beam may retain and output the initial linear polarization to the beam splitter module 212, without any change in the state (that is, angle) of the linear polarization. In FIG. 4, the fourth reflective optical element 216 is illustrated as a flat mirror, but for the reason stated above, various forms of polarized reflective optical systems may be employed. For example, the fourth reflective optical element 216 may have a polarized reflective optical surface with any one form of concave, convex, curved surface having free-form and a diffuse reflective surface or be configured as a diffractive optical element.

As an example, refractive indexes $n_1$ and $n_2$ in each optical path to the third and fourth reflective optical elements 214 and 216 and a refractive index no of the beam splitter module 212 may be different from each other in order to make the third and fourth beams have different optical paths by the third and fourth reflective optical elements 214 and 216. As another example, offset lengths $l_1$ and $l_2$ in each optical path to the third and fourth reflective optical elements 214 and 216 may be different. As yet another example, in order to make a difference in optical path, both a refractive index and an offset length may be differently set. In order to generate a hologram, a difference between two optical paths may be defined by refractive indexes $n_1$ and $n_2$ and/or offset lengths $l_1$ and $l_2$, and the definition may be reflected in design and fabrication. The optical path difference thus defined may be designed within a coherence length of a light source required for acquiring a hologram based on a natural light.

In addition, each linear polarization related to third and fourth beams may be reflected on mirror surfaces with different curved surfaces in the third and fourth reflective optical elements 214 and 216 and be modulated to different wave fronts.

As this embodiment uses not a beam splitter and a geometric phase lens but a conventional reflective optical system for optical path splitting and wave front modulation, it is easy to design and fabricate an optical system without wave-length dependence. In addition, since independent wavefront optical modulation of two channels is applied instead of optical modulation according to a geometric phase lens, degree of freedom in design increases significantly, and hologram characteristics described in FIG. 1 may be enhanced. Furthermore, as an optical system performing functions of splitting an optical path and modulating a wave front is monolithically combined, the miniaturization and simplification of a system may be realized.

The polarization control element 218 may not only be disposed between the beam splitter module 212 and the image generating device 220 but also be monolithically combined with the beam splitter module 212. As the polarization control element 218 is actually the same as in FIG. 1, the detailed description will be skipped.

The image generating device 220 may receive an interference fringe caused by interference between a third beam and a fourth beam having circular polarizations with different states, thereby generating a hologram image. In FIG. 4, the image generating device 220 is illustrated as a part separate from the polarization control element 218 but may be integrated and combined with the beam splitter module 221, together with the polarization control element 218.

According to another embodiment again, due to the image generating device 220 and the polarization control element 218 equipped with the micro polarizer array (132 of FIG. 1), geometric phase shifting may be processed with no mechanical movement, and a real-time hologram may be acquired. In addition, as the polarization control element 218 and the image generating device 220 are monolithically combined with the beam splitter module 212, the hologram acquisition system 200 may have robustness to oscillations.

Hereinafter, referring to FIG. 4 and FIG. 4, an operation of a hologram acquisition device according to this embodiment will be described. FIG. 5 is a table exemplifying a polarization form and a change of state in each optical path in a hologram acquisition system according to another embodiment.

In FIG. 4, ③ and ④ (hereinafter referred to as optical path 3 and optical path 4 respectively) denote optical paths which are modulated by the mirror surfaces of the third and fourth reflective optical elements 214 and 216 in order to form a hologram.

An object beam starting from the object 10 to be photographed may be incident on the beam splitter module 212. The object beam may be reflected a third beam of a linear polarization on a polarized mirror surface of the third reflective optical element 214. Among object beams, a fourth beam having a linear polarization orthogonal to a third beam may penetrate a polarized mirror surface. Accordingly, the third and fourth beams may be split into 2 optical paths by the third reflective optical element 214. Herein, the polarized mirror surface is illustrated as a concave mirror form for modulating a wave front, and the third beam modulated by the polarized mirror surface is denoted as the optical path ③ (hereinafter, referred to as optical path 3). The fourth beam penetrating the polarized mirror surface is denoted as the optical path ④ (hereinafter, referred to as optical path 4). The fourth beam may be reflected from the polarized mirror surface and be incident to the beam splitter module 212 again. As the fourth beam is in a polarization state penetrating the polarized mirror surface, it may not be optically modulated by the polarized mirror surface.

By the refractive indexes $n_1$ and $n_2$ and offset lengths $l_1$ and $l_2$ in each of the optical paths 3 and 4, a difference of optical path may be generated between the third beam and the fourth beam.

After the third and fourth beams on the optical paths 3 and 4 are combined by the beam splitter module 212, the third and fourth beams may pass a quarter wave plate, which functions as the polarization control element 218, and then be incident to the image generating device 130, for example, a polarized image sensor. The first and second beams, which are input from the beam splitter module 212 to the polarized image sensor along the optical paths 3 and 4, may be interfered by each other, so that a hologram image may be formed. Actually, like an embodiment, 4 amplitude images corresponding to polarization states of the polarized image sensor may be recorded, and different phase delay values may be generated based on the same principle as in an embodiment. A polarization form and a state change according to another embodiment may be exemplified as in FIG. 5.

Similar to an embodiment, the above-described polarization change may be analyzed using the Jones matrix calculus to derive a phase delay value. Polarization states of 2 optical paths according to 3 and 4 may be expressed by Equation 6, and a complex hologram with spatial noise being removed may be acquired by applying a phase shifting technique in a similar process. A polarization form and/or state is determined according to a design value or set value of the polarization control element 122 consisting of a quarter wave plate, and the polarization forms and/or states expressed FIG. 5 and Equation 6 are exemplified by being determined using a specified value among design values of the polarization control element 218. The polarization forms may be, for example, a linear polarization, a circular polarization and the like, and the polarization states may be an angle of a linear polarization, a left/right-circular polarization and the like.

$$T_{\scriptsize\textcircled{3}} = LP_\theta \cdot Q(45) \cdot H$$

$$T_{\scriptsize\textcircled{4}} = LP_\theta \cdot Q(45) \cdot V \quad \text{[Equation 6]}$$

Figure 6:
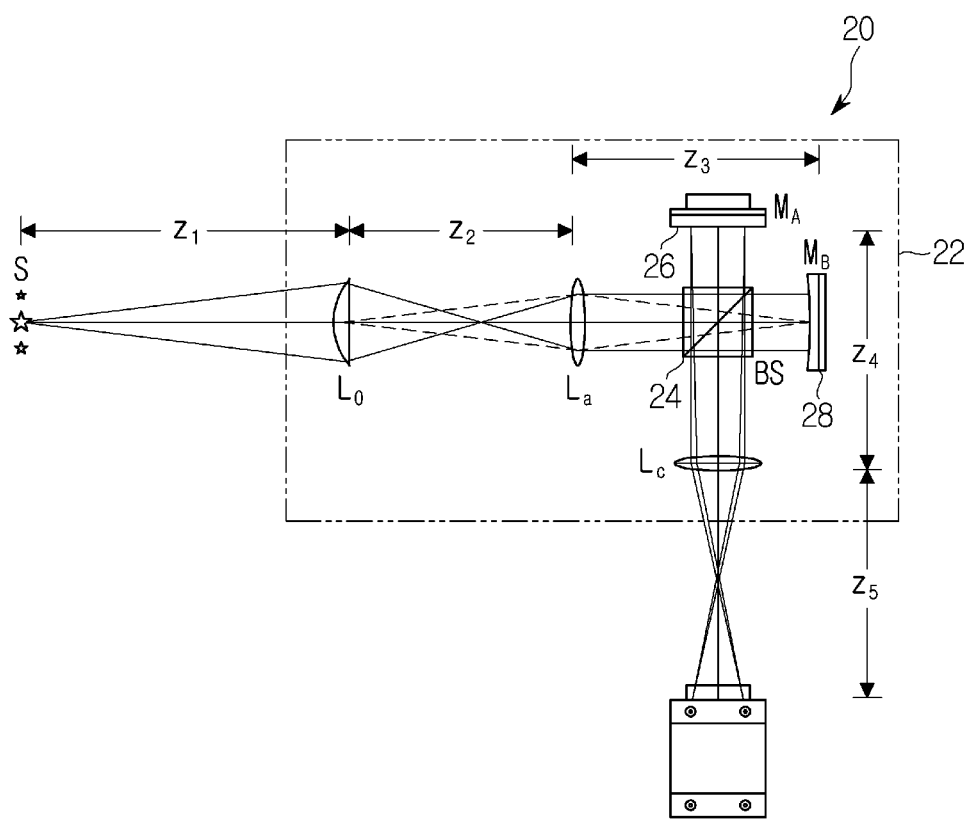
FIG. 6 is a view showing a schematic configuration of a first conventional hologram acquisition system to which SIDH is applied.

FIG. 6 is a view showing a schematic configuration of a first conventional hologram acquisition system to which SIDH is applied.

Self-interference incoherent digital holography (SIDH) is a self-interference digital holography using an incoherent light source.

A first conventional hologram acquisition system 20 may include a beam splitter 24 capable of splitting an object beam into 2 channels and a hologram acquisition device 110 equipped with first and second mirrors 26 and 28. The first and second mirrors 26 and 28 have mirrors with different curvatures and may optically modulate 2 channels by mirrors of each channel. When the 2 channels with different features are combined into one channel by the beam splitter 24, an interference fringe is generated.

In this case, generally, the optical paths of the 2 channels (based on a chief ray) are identically set, and a curvature of a mirror may be determined so that a difference of degree in optical modulation (marginal ray) is generated within a short interference length (approximately dozens of μ meters) of a normal natural light. Although SIDH is capable of acquiring a hologram by using a natural light, since an object beam and a reference beam have different optical paths (channels), SIDH has some shortcomings like a limitation in reducing a form factor and vulnerability to oscillation. In addition, according to SIDH, in order to apply image processing of phase shifting that removes image noise, for example, the piezoelectric element phase shifting stated in the related art is essentially required, but as the technique is accompanied by a mechanical movement, a real-time hologram is actually impossible to acquire.

Like the first conventional system 20, since the hologram acquisition systems 100 and 200 according these embodiments have no wavelength dependence and use a conventional reflective optical system, it is easy to fabricate an optical system. Furthermore, the hologram acquisition system 100 according to these embodiments has no shortcoming present in the first conventional system 20. That is, the systems 100 and 200 according to this embodiment may accomplish oscillation robustness, real-time holograms and the simplification and miniaturization of optical systems.

Figure 7:
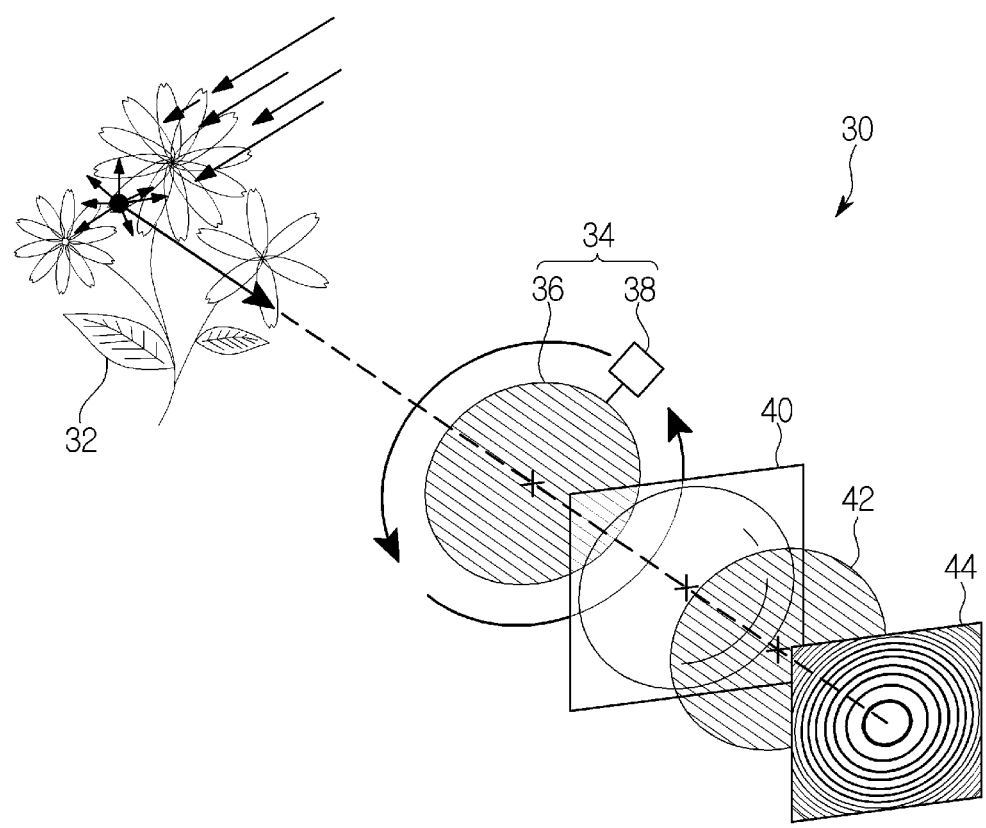
FIG. 7 is a view showing a schematic configuration of a second conventional hologram acquisition system to which GP-SIDH is applied.

FIG. 7 is a view showing a schematic configuration of a second conventional hologram acquisition system to which GP-SIDH is applied.

A second conventional hologram acquisition device 330 may be equipped with a polarization selective element 34, which includes a rotary polarizer 36 and a rotation driving unit 18 that rotates the rotary polarizer 36, a geometric phase lens 40, a fixed polarizer 42, and an image sensor 44.

The rotation driving unit 38 is configured to sequentially rotate the rotary polarizer 36 at 45 degrees so that the rotary polarizer 36 outputs polarizations obtained by sequential phase-shifting at a 90-degree interval for incident light of a target object 32.

The geometric phase lens 40 modulates a linear polarization, which is converted through the polarization selective element 34, to a left-handed circular polarization and a right-handed circular polarization. Specifically, the geometric phase lens 40 is configured as a passive element with a film form. The geometric phase lens 40 may function as a concave or convex lens with a same focal distance according to a linear polarization state of an incident light. Accordingly, when a light in a linear polarization state is incident on a geometric phase lens, a part of the lens functions as a concave lens and the remaining part functions as a convex lens, so that a wave front is modulated.

The fixed polarizer 42 changes the left-handed circular polarization and the right-handed circular polarization to linear polarizations. The image sensor 44 may sequentially obtain an interference fringe by interference of circular polarizations sequentially received and generate a complex hologram.

The function of a beam splitter and a wavefront modulation optical system (2 mirrors), which constitute SIDH according to the first conventional system 20, may be replaced by the geometric phase lens 40 in the second conventional system 30. When applying the geometric phase lens to a self-interference hologram, an object beam and a reference beam may have a same optical axis.

Like the second conventional system 20, the hologram acquisition systems 100 and 200 according to these embodiments may have advantages according to oscillation robustness, miniaturization and a polarized image sensor. Furthermore, the hologram acquisition system 100 according to these embodiments has no shortcoming present in the second conventional system 30. That is, the systems 100 and 200 according to this embodiment may realize wavelength independence, high degree of freedom in design and acquisition of a real-time hologram.

Figure 8:
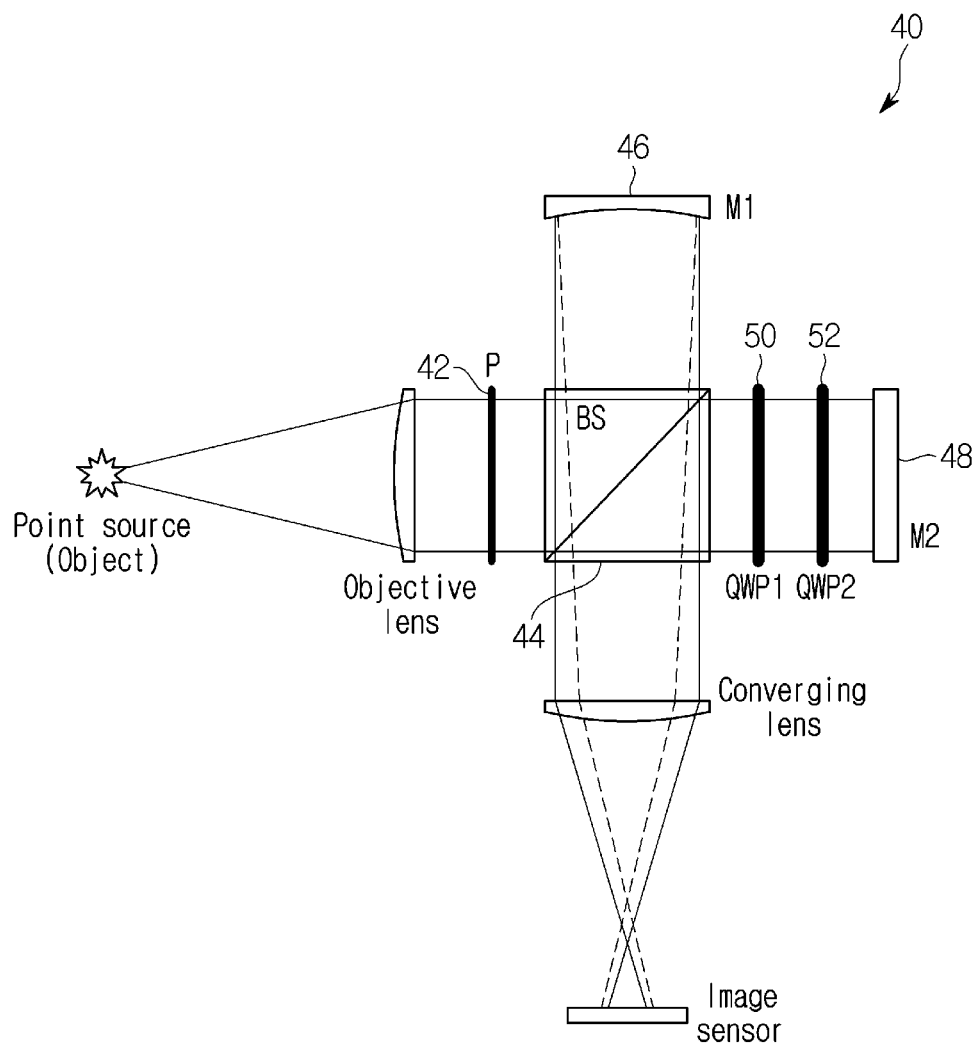
FIG. 8 is a view showing a schematic configuration of a third conventional hologram acquisition system to which geometric phase shifting is applied.

FIG. 8 is a view showing a schematic configuration of a third conventional hologram acquisition system to which geometric phase shifting is applied.

A third conventional hologram acquisition system 40 may be a system that processes geometric phase shifting by employing the mechanical method mentioned in the related art. The third hologram acquisition system 40 may be equipped with a linear polarizer 42 capable of emitting an object beam as a linear polarization, a beam splitter 44 capable of splitting it to 2 channels, first and second mirrors 46 and 48 having a same function as the first conventional system 20, and first and second quarter wave plates 50 and 52.

The third conventional system 40 uses the principle of geometric phase delay caused by a polarization change. Specifically, a hologram may be acquired by rotating the linear polarizer 42 and the first and second quarter wave plates 50 and 52 and generating different geometric shiftings at each angle.

However, as the third conventional system 40 is accompanied by a mechanical movement like rotation for applying phase shifting, it is impossible to acquire a real-time hologram. On the other hand, in addition to the above-described advantages, the hologram acquisition systems 100 and 200 according to these embodiments may acquire a real-time hologram by means of the polarization control element 122 and the polarized image sensor 130.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A hologram acquisition device comprising:
a beam splitter module splitting a light emitted from an object into a first beam and a second beam which have polarizations in different states;
an optical control module equipped with a first reflective optical element, which is disposed at one side of the beam splitter module and receives and emits the first beam to the beam splitter module, and a second reflective optical element which is placed at the other side of the beam splitter module, receives the second beam and emits the second beam to the beam splitter module so as to have differences of optical path and wavefront from the first beam;
a first quarter wave plate monolithically combined between the first reflective optical element and the beam splitter; and
a second quarter wave plate monolithically combined between the second reflective optical element and the beam splitter,
wherein the beam splitter module, the first reflective optical element and the second reflective optical element are monolithically installed by being fixed to each other,
wherein the first beam and the second beam are linear polarizations at angles different from each other, and
wherein the first beam and the second beam, which are emitted from the beam splitter, are incident on the first quarter wave plate and the second quarter wave plate and are output as circular polarizations with states different from each other, the first beam and the second beam having the circular polarizations are wavefront modulated by being reflected from the first reflective optical element and the second reflective optical element, and the first beam and the second beam, which are wavefront modulated, are incident on the first quarter wave plate and the second quarter wave plate again and are output as linear polarizations.

2. The hologram acquisition device of claim 1, wherein the first reflective optical element and the second reflective optical element have a reflective optical surface with any one form of flat, convex, concave, curved surface having free-form and a diffuse reflective surface, or are configured as a diffractive optical element.

3. The hologram acquisition device of claim 1, wherein refractive indexes for the beam splitter in each optical path to the first reflective optical element and the second reflective optical element are different in order to have a difference of optical path, or offset lengths in each optical path are different in order to have the difference of optical path.

4. The hologram acquisition device of claim 1,
wherein the beam splitter module combines the first beam and the second beam, which have differences of optical path and wavefront, and emits the combined first and second beams to an image generating device located at an exterior of the beam splitter module,
the hologram acquisition device further comprises a polarization control element that is disposed between the image generating device and the beam splitter module and is monolithically combined with the beam splitter module, and
wherein the polarization control element outputs the linear polarization by changing the linear polarization to a polarization with a predetermined form in order to apply phase shifting processing performed in the image generating device.

5. A hologram acquisition system comprising:
a hologram acquisition device equipped with a beam splitter module and an optical control module;
an image generating device receiving an interference fringe generated from the hologram acquisition device and generating a hologram images;
a first quarter wave plate monolithically combined between the first reflective optical element and the beam splitter; and
a second quarter wave plate monolithically combined between the second reflective optical element and the beam splitter,
wherein the beam splitter module splits a light emitted from an object into a first beam and a second beam which have polarizations in different states,
wherein the optical control module is equipped with a first reflective optical element, which is disposed at one side of the beam splitter module and receives and emits the first beam to the beam splitter module, and a second reflective optical element which is placed at the other side of the beam splitter module, receives the second beam and emits the second beam to the beam splitter module so as to have differences of optical path and wavefront from the first beam,
wherein the beam splitter module, the first reflective optical element and the second reflective optical element are monolithically installed by being fixed to each other,
wherein the first beam and the second beam are linear polarizations at angles different from each other, and
wherein the first beam and the second beam, which are emitted from the beam splitter, are incident on the first quarter wave plate and the second quarter wave plate and are output as circular polarizations with states different from each other, the first beam and the second beam having the circular polarizations are wavefront modulated by being reflected from the first reflective optical element and the second reflective optical element, and the first beam and the second beam, which are wavefront modulated, are incident on the first quarter wave plate and the second quarter wave plate again and are output as linear polarizations.

6. The hologram acquisition system of claim 5, wherein the image generating device includes a polarized image sensor that processes phase shifting for the interference fringe and acquires the hologram image by using the phase-shifted interference fringe.

7. The hologram acquisition system of claim 5, wherein refractive indexes for the beam splitter in each optical path to the first reflective optical element and the second reflective optical element are different in order to have a difference of optical path, or offset lengths in each optical path are different in order to have a difference of optical path.

8. The hologram acquisition system of claim 5, wherein the beam splitter module combines the first beam and the second beam, which have differences of optical path and wavefront, and emits the combined first and second beams to the image generating device,

- the hologram acquisition device further comprises a polarization control element that is placed between the image generating device and the beam splitter module and is monolithically combined with the beam splitter module, and wherein the polarization control element outputs the linear polarization by changing the linear polarization to a polarization with a predetermined form in order to apply phase shifting processing performed in the image generating device.

* * * * *